United States Patent Office 2,694,658
Patented Nov. 16, 1954

2,694,658

METAL STRIPPING PROCESS

Wilfred J. Crepeau, Chicago, and Vincent A. Sullivan, Jr., Lyons, Ill., assignors to The Stepan Chemical Company, Chicago, Ill., a corporation of Illinois No Drawing. Application September 3, 1953, Serial No. 378,405

8 Claims. (Cl. 134—26)

This invention relates to a process of removing a plastic coating from a metal article, and more particularly, to a process for stripping insulation coatings from insulated wire.

Electric wires of various sizes are advantageously and conveniently provided with an insulating coating consisting of plastic materials. Most preferably, such plastic materials are of the type hereinafter referred to as "polyvinyl alkanal resins," which are resins obtained by condensation of an aldehyde with a polyvinyl alcohol (or polyvinyl alcohol source such as polyvinyl acetate) resin. The polyvinyl alcohol-aldehyde condensates are well known in the art and are usually derived from a $C_1$–$C_4$ aldehyde such as formaldehyde, acetaldehyde or butyraldehyde (being called respectively polyvinyl "formal," "acetal" and "butyral").

These resins are particularly well adapted to adhere securely to the metal surface of, for example, a wire during flexing of the wire and the like; but their particularly good adherence to the metal surface provides another problem when it becomes necessary to remove the resinous coating from the wire surface. This is necessary whenever wires are to be soldered together or some other type of electrical connection is to be fabricated.

Both mechanical and chemical processes are known for removal of the resinous coatings from wire, but these processes leave much to be desired. If the plastic insulation is mechanically stripped as by scraping, the removal of the material is almost invariably accompanied by some physical damage to the wire, particularly in the case of fine wires. The suggestion that the coated wire should be dipped in solder and/or various other chemicals heated to above 1000° F. for the purpose of removing the plastic coating by thermal decomposition also has not proved to be completely successful because this procedure tends to cause a certain amount of injury to the wire itself.

The use of certain other chemical reactants, such as acids in concentrated form, has also been suggested but this creates certain problems in handling the highly corrosive and possibly toxic acid solutions. Certain solvents have been suggested, but a particularly important property of the instant polyvinyl alkanal resins is their solvent resistance and these resins are substantially unaffected by practically all of the recognized resin solvents, such as acetone, etc.

The instant invention is based upon the discovery of a unique active ingredient which is capable of quickly separating the resin coating from a metal surface without causing damage to the metal surface and without involving such industrial hazards as toxicity and fires or explosions.

It is therefore an important object of the instant invention to provide an improved resin-stripping composition and an improved method of stripping resin coatings from a metal article.

It is another object of the instant invention to provide an improved method of stripping a polyvinyl alkanal resin coating from a copper wire by treating the coated wire with a softening and swelling agent for the resin that is quick acting, non-toxic, non-corrosive with respect to the copper, easily handled commercially and non-inflammable under the operating conditions here involved.

Other objects, features and advantages of the invention will become apparent to those skilled in the art from the following detailed disclosure of preferred embodiments of the invention.

The invention consists in a method of stripping a polyvinyl alkanal resin coating from a metal article, which comprises treating the coated article with dimethyl sulfoxide until the resin has softened and swelled, and then separating the softened swollen resin from the article.

As hereinbefore mentioned, the polyvinyl alkanal resins are a well known class of resins, the most commercially significant of which are polyvinyl formal, polyvinyl acetal and polyvinyl butyral resins, which are preferred for use in the practice of the instant invention. The metal article preferred for use in the instant invention is, of course, copper wire; but a number of other different metals particularly those sometimes used to replace copper electrical conductors (such as aluminum) may be used. Preferably, the metal article is a flexible wire-like or rod-like article of the type ordinarily coated with polyvinyl alkanal resin insulator.

The instant invention is based upon the discovery that dimethyl sulfoxide, which has the following formula:

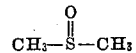

has uniquely superior properties as an essential ingredient, or the sole ingredient, in a wire stripping composition. Dimethyl sulfoxide has a boiling point of about 190° C. at atmospheric pressure; and it has been found to have unusually effective solvent action with respect to certain resins. Dimethyl sulfoxide has also been found to have unusually good heat stability so that it may be maintained at relatively high temperatures (below the boiling point thereof) for sustained periods of time, if it is desired to employ this material in heated form for carrying out the process of the instant invention. Also, dimethyl sulfoxide has a high flash point and in liquid as well as in vapor form it is substantially non-toxic. Also, it is completely miscible with water so that water may be used to substantially completely extract the solvent from the resin after the stripping action has been completed, and the dimethyl sulfoxide and water may be separated readily by distillation, if such is desired. Dimethyl sulfoxide is also substantially non-corrosive with respect to the various metal surfaces which may be used in the practice of the invention, and particularly with respect to copper.

In demonstrating the instant invention, No. 30 copper wire coated with polyvinyl acetal insulation is dipped in a bath of dimethyl sulfoxide maintained at 150° C. Almost instantly a noticeable "leaching" action on the resin takes place, and this is followed in a short time by softening and swelling of the resin. The wire is then removed from the bath (and optionally dipped in cooling water for a short time) and the coating is stripped from the wire by the application of pressure between the nails of the thumb and forefinger, permitting stripping of the resin in a single motion. The stripped resin may be washed in water so as to effectively "leach" all of the dimethyl sulfoxide out of the scrap resin; and the dimethyl sulfoxide may be subsequently recovered from the water by distillation. The portion of the wire from which the resin coating was removed is clean and free from resin particles and is not corroded.

Carrying out the foregoing procedure, using a temperature of 50° C. instead of 150° C., results in a substantially slower swelling and softening action, although still a noticeable action. Preferably the instant procedure is carried out using temperatures of about 120–180° C. using dimethyl sulfoxide alone or in the presence of liquids whose boiling points are at least slightly higher than the temperature used. The same results are obtained using polyvinyl formal and polyvinyl butyral insulation.

Another aspect of the instant invention is based upon the discovery that certain additional liquids miscible with dimethyl sulfoxide may be used therewith advantageously in the practice of the instant invention. The use of such other liquids apparently tends to increase the proportionate effectiveness of dimethyl sulfoxide for the purposes of the instant invention, so that proportionately less dimethyl sulfoxide need be used and/or a correspondingly lower operating temperature may be used. For example, using a solution of 25 volume per cent water and 75 volume per cent dimethyl sulfoxide at 90° C. it is possible to obtain substantially the same speed of softening and swelling that is obtained in carrying out the original demonstration herein (i. e., dimethyl sulfoxide at 150° C.).

Certain other non-aqueous diluents or "lacquer" solvents may also be used advantageously in conjunction with dimethyl sulfoxide in the practice of the instant invention. Typical formulations of dimethyl sulfoxide with one or more of such solvents and diluents, which are particularly useful in the practice of the instant invention, include the following:

*Formulation I*

| | Volume percent |
|---|---|
| Dimethyl sulfoxide | 50 |
| Acetone | 50 |

*Formulation II*

| | |
|---|---|
| Dimethyl sulfoxide | 10 |
| Acetone | 80 |
| Naphtha | 10 |

*Formulation III*

| | |
|---|---|
| Dimethyl sulfoxide | 75 |
| Ethyl acetate | 25 |

*Formulation IV*

| | |
|---|---|
| Dimethyl sulfoxide | 50 |
| Isopropyl alcohol | 25 |
| Ethyl alcohol | 25 |

*Formulation V*

| | |
|---|---|
| Dimethyl sulfoxide | 35 |
| Butyl acetate | 35 |
| Ethyl propyl ether | 30 |

*Formulation VI*

| | |
|---|---|
| Dimethyl sulfoxide | 25 |
| Acetone | 25 |
| Ethyl acetate | 25 |
| Butyl alcohol | 25 |

Each of the foregoing solvent mixtures has been found to be particularly effective for removal of resin coatings from a metal surface. Also, it has been found that even in solvent mixtures wherein the ratio of dimethyl sulfoxide to the remaining solvents is as little as 1:10 (volume basis) the effectiveness of the dimethyl sulfoxide is apparent. In general, the volume ratio of dimethyl sulfoxide to the additional lacquer solvent (or mixture of solvents) may range from about 1:10 to about 5:1, if it is desired to obtain the advantageous aspects of both the dimethyl sulfoxide and the additional lacquer solvent in such a solvent mixture.

As has been indicated, the lacquer solvents here involved are of the class consisting of ethers, ketones, esters and alcohols and mixtures thereof. Typical ethers include diethyl ether, ethyl propyl ether, and the higher, less volatile analogues thereof. The ketones which may be used as lacquer solvents include acetone, methyl ethyl ketone, and the higher analogues thereof, although acetone is usually preferred. The esters which are used as lacquer solvents include ethyl acetate, propyl acetate, butyl acetate and the higher analogues thereof; and again, the lower member of this series which is sufficiently non-volatile to be preferred is ethyl acetate. Actually, all of these lacquer solvents are classified as volatile or quick drying solvents, even though the most extremely volatile members of these classes of compounds are usually not preferred for use in a resin stripping composition. The alcohols, which are principally used as diluents, include ethyl alcohol, propyl alcohol, butyl alcohol, etc. Actually, the ketones and esters are the more active solvents and acetone and/or ethyl acetate are the preferred solvents, among low boiling solvents.

Besides the alcohols, certain other diluents such as naphtha may be used to advantage in the instant invention. In general, however, paraffinic hydrocarbons are not preferred for use in the instant invention solely with the dimethyl sulfoxide (because of a tendency toward incompatibility), although such hydrocarbons may be used in combination with dimethyl sulfoxide and another more compatible solvent such as a ketone or ester.

As has been indicated, the foregoing ethers, ketones, esters and alcohols are all typical volatile solvents which may be used in the practice of the instant invention when the use of solvents of this type is preferred (as in certain cases wherein solvent recovery can be most advantageously carried out in the vapor phase); however, the solvents actually preferred for use in the instant invention are the so-called high boiling solvents which may be used in solution with dimethyl sulfoxide at temperatures within the preferred range of 120–180° C. Such high boiling solvents include alcohols such as ethylene, glycol, alcoholethers such as diethylene glycol, esters such as tributyl citrate, and ketones such as 2,4-pentanedione. Any of the foregoing may be substituted for ethyl acetate in Formulation III, for example, to yield a formulation which is particularly effective at 130° C. Preferably, the high boiling solvents used (are miscible with dimethyl sulfoxide and) have boiling points of about 130°–250° C.

In the case of water, which has substantially no solvent action per se on the resin the amount of water admixed with the dimethyl sulfoxide may range from a minimum effective amount of 5 volume percent to a maximum amount of 50 volume percent above which the water dilutes the action of the dimethyl sulfoxide unnecessarily, and preferably the amount of water is 25 volume per cent. In the case of the "lacquer" solvents, however, substantially greater volume proportions of 10 parts solvent to 1 part dimethyl sulfoxide may be used, and vice versa.

It will be understood that modifications and variations may be effected without departing from the scope of the novel concepts of the present invention.

We claim as our invention:

1. A method of stripping a polyvinyl alkanal resin coating from a metal article, which comprises treating the coated article with dimethyl sulfoxide until the resin has softened and swelled, and then separating the softened swollen resin from the article.

2. A method of stripping a polyvinyl formal resin coating from a metal article, which comprises treating the coated article with dimethyl sulfoxide until the resin has softened and swelled, and then separating the softened swollen resin from the article.

3. A method of stripping a polyvinyl acetal resin coating from a metal article, which comprises treating the coated article with dimethyl sulfoxide until the resin has softened and swelled, and then separating the softened swollen resin from the article.

4. A method of stripping a polyvinyl butyral resin coating from a metal article, which comprises treating the coated article with dimethyl sulfoxide until the resin has softened and swelled, and then separating the softened swollen resin from the article.

5. A method of stripping a polyvinyl alkanal resin coating from a copper wire which comprises treating the coated wire with dimethyl sulfoxide until the resin has softened and swelled, and then separating the softened swollen resin from the wire.

6. A method of stripping a polyvinyl alkanal resin coating from a metal article, which comprises treating the coated article with a softening agent consisting essentially of 50–95 volume percent dimethyl sulfoxide and 5–50 volume percent water until the resin has softened and swelled, and then separating the softened swollen resin from the article.

7. A method of stripping a polyvinyl alkanal resin coating from a metal article, which comprises immersing the coated article in dimethyl sulfoxide at 120°–180° C. until the resin has softened and swelled, and then separating the softened swollen resin from the article.

8. A method of stripping a polyvinyl alkanal resin coating from a metal article, which comprises treating the coated article with (*a*) dimethyl sulfoxide and (*b*) a lacquer solvent of the class consisting of ethers, ketones, esters and alcohols and mixtures thereof, the volume ratio of (*a*):(*b*) ranging from 1:10 to 10:1.

No references cited.